United States Patent
Kaltenbach

(10) Patent No.: US 7,892,139 B2
(45) Date of Patent: Feb. 22, 2011

(54) HYBRID DRIVE ARRANGEMENT AND METHOD FOR CONTROLLING AND/OR REGULATING A STARTING PROCESS WITH A HYBRID DRIVE ARRANGEMENT

(75) Inventor: Johannes Kaltenbach, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 371 days.

(21) Appl. No.: 12/287,217

(22) Filed: Oct. 7, 2008

(65) Prior Publication Data

US 2009/0098977 A1    Apr. 16, 2009

(30) Foreign Application Priority Data

Oct. 12, 2007    (DE) ........................ 10 2007 049 137

(51) Int. Cl.
*B60W 10/08*    (2006.01)
(52) U.S. Cl. .......................................... 477/5
(58) Field of Classification Search ...................... 477/5
See application file for complete search history.

(56) References Cited

U.S. PATENT DOCUMENTS 6,705,416 B1    3/2004    Glonner et al.

(Continued)

FOREIGN PATENT DOCUMENTS

DE    199 17 665 A1    10/2000

(Continued)

*Primary Examiner*—Dirk Wright
(74) *Attorney, Agent, or Firm*—Davis & Bujold, P.L.L.C.

(57) ABSTRACT

A method is proposed for controlling and/or regulating a starting process in a hybrid drive arrangement of a vehicle, in which at least one control unit (8) is used by means of which a combustion engine (1), at least one electric machine (3), a transmission (4) and a first clutch (2) arranged between the combustion engine (1) and the electric machine (3) and a second clutch (5) arranged between the electric machine (3) and the transmission (4) are controlled so as to carry out a starting process, such that to change from electric starting to at least partially combustion-engine-powered staring the clutch torque that can be transferred is adjusted to the nominal driving torque so that the torque of the electric machine (3), the torque of the combustion engine (1) and/or the clutch torque of the first clutch (2) are matched. In addition a hybrid drive arrangement of a vehicle with at least one control unit (6) is proposed, by means of which a combustion engine (1), at least one electric machine (3), a transmission (4) and a first clutch (2) arranged between the combustion engine (1) and the electric machine (3) and a second clutch (5) arranged between the electric machine (3) and the transmission (4) can be controlled so as to carry out a starting process, such that to change from electric starting to at least partially combustion-engine-powered staring the clutch torque that can be transferred by the second clutch (5) is adjusted to the nominal driving torque so that the torque of the electric machine (3), the torque of the combustion engine (1) and/or the clutch torque of the first clutch (2) can be matched.

16 Claims, 1 Drawing Sheet

U.S. PATENT DOCUMENTS

| | | |
|---|---|---|
| 7,758,467 B2 * | 7/2010 | Ashizawa et al. ............... 477/5 |
| 7,762,922 B2 * | 7/2010 | Dreibholz et al. .............. 477/5 |
| 2003/0153429 A1 | 8/2003 | Boll |
| 2007/0207892 A1 | 9/2007 | Dreibholz et al. |
| 2010/0197452 A1 * | 8/2010 | Kaltenbach et al. ........... 477/14 |
| 2010/0204005 A1 * | 8/2010 | Kaltenbach .................... 477/5 |
| 2010/0210410 A1 * | 8/2010 | Kaltenbach et al. ............ 477/3 |

FOREIGN PATENT DOCUMENTS

| | | |
|---|---|---|
| DE | 101 58 536 A1 | 7/2003 |
| DE | 103 27 306 A1 | 1/2005 |
| DE | 10 2004 023 673 A1 | 12/2005 |
| DE | 10 2006 005 468 A1 | 8/2007 |
| DE | 10 2007 001 895 A1 | 7/2008 |

* cited by examiner

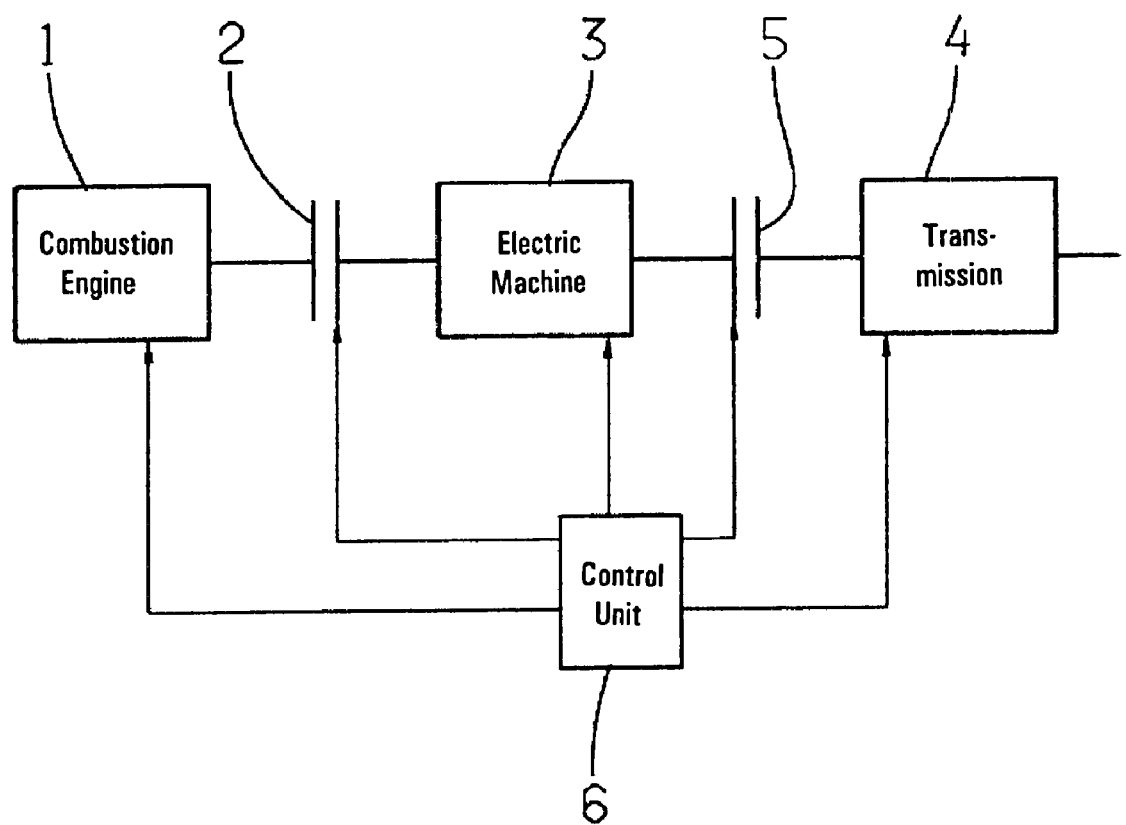

HYBRID DRIVE ARRANGEMENT AND METHOD FOR CONTROLLING AND/OR REGULATING A STARTING PROCESS WITH A HYBRID DRIVE ARRANGEMENT

This application claims priority from German Application Serial No. 10 2007 049 137.0 filed Oct. 12, 2007.

FIELD OF THE INVENTION

The present invention concerns a hybrid drive arrangement and a method for controlling and/or regulating a starting process with a hybrid drive arrangement.

BACKGROUND OF THE INVENTION

From automotive technology, hybrid drive arrangements and methods for controlling and/or regulating a starting process for vehicles are known. The known hybrid drive arrangement comprises an internal combustion engine which can be coupled by way of a first clutch to an input shaft of an electric machine. The electric machine is connected, via a second clutch, to the input shaft of a variable-ratio transmission. The second clutch may also be integrated in the transmission. In addition, a control unit is provided, which controls the individual components to bring about a starting process in the vehicle.

When the combustion engine is idling, the first clutch is disengaged, the second clutch is engaged and a starting gear is engaged in the transmission, a purely electric start takes place. In these driving situations, the vehicle does not accelerate sufficiently to allow the combustion engine to be coupled by way of the first clutch, since the speed of the electric machine is too low. Possible reasons for this are that the starting resistance is too high; the electrical energy available from the energy accumulator is too little or the electric machine cannot build up sufficient torque. Thus, the combustion engine must deliver an additional torque. Since the first clutch cannot be used as a starting clutch, combustion-engine-powered starting must take place via the second clutch.

To bring about the transition to combustion-engine-powered starting, in the known method it can be provided that the starting torque at the electric machine is first reduced so as to be able to disengage the second clutch. This allows the electric machine to be coupled to the combustion engine via the first clutch. This is done by synchronizing the speeds of the electric machine and the combustion engine so that the first clutch can be engaged. In this way, starting can be carried out using the second clutch so that the torque from the combustion engine and the torque from the electric machine are combined to bring about a hybrid start via the second clutch. This, however, has the disadvantage that with the known method an interruption of the traction force takes place during the transition from electric starting to hybrid starting.

The purpose of the present invention is to propose a hybrid drive arrangement and a method for controlling and/or regulating a starting process of the type described, by way of which a transition between a purely electric start and a combustion-engine-assisted or hybrid start can take place without interruption of the traction force.

SUMMARY OF THE INVENTION

The objective addressed by the invention is achieved by a method for controlling and/or regulating a starting process with a hybrid drive arrangement of a vehicle in which at least one control unit is used, by which a combustion engine, at least one electric machine, a transmission and a first clutch arranged between the combustion engine and the electric machine and a second clutch arranged between the electric machine and the transmission are controlled so as to carry out a starting process, such that to change from electric starting to at least partial combustion-engine-powered starting, the clutch torque that can be transferred by the second clutch is adjusted to the nominal driving torque, with corresponding adaptation of the torque of the electric machine and/or the torque of the combustion engine and/or the clutch torque of the first clutch. In this way, the torque transfer ability of the second clutch can be reduced continuously until a slipping condition of the second clutch is detected. This can be recognized by a speed measurement which determines the speed difference between the electric machine and the combustion engine. Only then can the electric machine be coupled to the combustion engine in order to enable hybrid starting.

In this way, by way of the method, a desired transition from purely electric starting to hybrid starting can be effected without interruption of the traction force.

This improves driving safety since, for example if the vehicle is driving uphill, it cannot roll back. In addition, the driving comfort is increased since there is no break in a process of acceleration. Furthermore, the driving behavior of the vehicle is rendered more dynamic so that better vehicle acceleration can be obtained. In that the starting torque is adjusted, the traction force of the vehicle is already adapted to the driver's wish already during the transition.

In a possible embodiment variation of the present invention, it can be provided that the electric machine is switched over to a speed-regulated mode, so that the clutch torque of the second clutch is used as a pre-control torque. In this embodiment variation, the electric machine can be brought by speed control to the synchronous speed. As a rule, in the driving situation outlined at the start, the speed of the combustion engine is always higher than the speed of the electric machine. When the synchronous speed is reached, the first clutch can be engaged. Thus, the starting function or starting process can be effected by a combination of the torque of the combustion engine and the torque of the electric machine acting together.

A further possible embodiment variation of the invention can provide that the transition from electric to combustion-engine-powered starting can take place simply by waiting until the speed of the electric machine is synchronous with the speed of the combustion engine. Preferably, if the speed of the electric machine is increasing too slowly, it can be provided that the clutch torque of the second clutch is reduced further. As soon as a pre-synchronous or synchronous speed between the electric machine and the combustion engine is recognized, the first clutch can be engaged. Thus, in this variation too, the starting function or process can be effected by the combination of the torque of the combustion engine and the torque of the electric machine.

Furthermore, a closely related variation of the invention can provide that, to change from electric to combustion-engine-assisted starting, the torque of the combustion engine is increased. For example, the combustion engine's speed regulation can be set above an idling speed. Other regulation possibilities are also conceivable. In this variation, synchronization between the speed of the electric machine and the speed of the combustion engine can be effected by the first clutch. Preferably, the first clutch can be engaged slowly in order to keep friction created at the first clutch within an acceptable range so that overheating of the first clutch is prevented. Finally, the first clutch is completely engaged and the transition to a starting function or starting process is effected in which the torque of the combustion engine and the torque of the electric machine are combined.

Thus, in all the embodiment variations, the clutch torque of the second clutch can be adjusted to the nominal driving torque. As a rule, the clutch torque can only be increased if the torque of the electric machine is sufficiently high. However, the clutch torque at the second clutch is always reduced and the torque of the electric machine, the combustion engine and the first clutch are adapted during the process so that hybrid starting by way of the second clutch is made possible.

The objective addressed by the invention is also achieved by a hybrid drive arrangement of a vehicle with at least one control unit, by which a combustion engine, at least one electric machine, a transmission and a first clutch arranged between the combustion engine and the electric machine and a second clutch arranged between the electric machine and the transmission can be controlled to carry out a starting process such that, to change from electric starting to at least partial combustion-engine-powered starting the clutch torque that can be transferred by the second clutch, can be adjusted to the nominal driving torque, whereby the torque of the electric machine, the torque of the combustion engine and/or the clutch torque of the first clutch can be matched.

In that the control unit contains corresponding control logic which continually reduces the torque transfer ability of the second clutch until slipping of the second clutch is detected, in order then to couple the combustion engine to the electric machine by way of the first clutch so as to enable hybrid starting, a traction-force-maintaining transition can be effected between pure electric starting and at least partial combustion-engine-powered starting.

Accordingly, with the proposed hybrid drive arrangement, the previously mentioned advantages are obtained by the method according to the invention. Preferably, the proposed hybrid drive arrangement can be used to carry out or implement the method. Other fields of application for the method can also be imagined.

Preferably, the hybrid drive arrangement and method proposed can be used with parallel hybrid drive systems in urban buses, goods distribution vehicles and transporters. Other fields of use are also conceivable.

BRIEF DESCRIPTION OF THE DRAWING

The invention will now be described, by way of example, with reference to the accompanying drawing in which:

The single FIGURE schematically shows a drive train of a vehicle with a hybrid drive arrangement according to the invention.

DETAILED DESCRIPTION OF THE INVENTION

The vehicle comprises a combustion engine 1 which can be coupled via a first clutch 2 to an electric machine 3. The drive output shaft of the electric machine is connected via a second clutch 5 to the input shaft of a variable transmission 4. The control actions by a control unit 6 are indicated in the FIGURE by arrows. The control unit can be made as a hybrid control unit and can comprise further control elements associated with the individual components to be controlled.

According to the method, a transition from electric starting to combustion-engine-assisted starting can be carried out with this hybrid drive arrangement without interrupting the traction force. To do this, the control unit 6 continuously reduces the torque transfer ability of the second clutch 5 until slipping of the second clutch 5 is detected. This can be recognized by measuring the speed difference between the electric machine 3 and the combustion engine 1. Once synchronization has taken place the electric machine 3 can be coupled to the combustion engine 1 by the first clutch 2 so that the starting process is at least supported by the torque of the combustion engine 1.

REFERENCE NUMERALS 1 combustion engine
2 first clutch
3 electric machine
4 transmission
5 second clutch
6 control unit

The invention claimed is:

1. A method for controlling and regulating a starting process with a hybrid drive arrangement of a vehicle, in which at least one control unit (6) is used, by which a combustion engine (1), at least one electric machine (3), a transmission (4) and a first clutch (2), arranged between the combustion engine (1) and the electric machine (3), and a second clutch (5), arranged between the electric machine (3) and the transmission (4), are controlled to carry out the starting process, the method comprising the steps of:
to change from electric starting to at least partially combustion-engine-powered starting, adjusting a clutch torque that is transferrable by the second clutch (5) to a nominal driving torque, and
matching at least one of a torque of the electric machine (3), a torque of the combustion engine (1) and a clutch torque of the first clutch (2).

2. The method according to claim 1, further comprising the step of continuously reducing the clutch torque that is transferrable by the second clutch (5) until slipping of the second clutch (5) is detected, and coupling the electric machine (3) to the combustion engine (1) by the first clutch (2) while the second clutch (5) is operated in slipping mode and transfers starting torque.

3. The method according to claim 1, further comprising the step of switching the electric machine (3) to a speed-regulated mode and using the clutch torque of the second clutch (5) as a pre-control torque.

4. The method according to claim 3, further comprising the step of adjusting the electric machine (3) to a synchronous speed with the combustion engine (1).

5. The method according to claim 4, further comprising the step of engaging the first clutch (2) when the synchronous speed is reached.

6. The method according to claim 5, further comprising the step of effecting a transition to a starting function in which the torque of the combustion engine (1) and the torque of the electric machine (3) act together.

7. The method according to claim 1, further comprising the step of delaying until a waiting period expires before synchronizing a speed of the electric machine (3) with a speed of the combustion engine (1).

8. The method according to claim 7, further comprising the step of further reducing the clutch torque of the second clutch (5), if the speed of the electric machine (3) increases too slowly.

9. The method according to claim 7, further comprising the step of engaging the first clutch (2) upon recognizing one of a pre-synchronous and a synchronous speed between the electric machine (3) and the combustion engine (1).

10. The method according to claim 9, further comprising the step of effecting a transition to a starting function in which the torque of the combustion engine (1) and the torque of the electric machine (3) act together.

11. The method according to claim 1, further comprising the step of one of increasing a torque of the combustion engine (1) and regulating a speed of the combustion engine (1) to above an idling speed.

12. The method according to claim 11, further comprising the step of synchronizing, via the first clutch (2), the speed of the electric machine (3) with the speed of the combustion engine (1).

13. The method according to claim 12, further comprising the step of slowly engaging the first clutch (2).

14. The method according to claim 12, further comprising the step of engaging the first clutch (2) and initiating the starting function, once synchronization has taken place, in which the torque of the combustion engine (1) and the torque of the electric machine (3) act together.

15. The hybrid drive arrangement of a vehicle, having at least one control unit (6) by which a combustion engine (1), at least one electric machine (3), a transmission (4) and a first clutch (2), arranged between the combustion engine (1) and the electric machine (3), and a second clutch (5), arranged between the electric machine (3) and the transmission (4), are controlled to initiate a starting process in which to change from electric starting to at least partially combustion-engine-powered starting, clutch torque that is transferrable by the second clutch (5) is adjusted to a nominal driving torque, and at least one of torque of the electric machine (3), torque of the combustion engine (1) and clutch torque of the first clutch (2) are matched.

16. A method for controlling a starting process of a hybrid drive arrangement of a vehicle, the method comprising the steps of:
controlling a combustion engine (1), at least one electric machine (3), a transmission (4), a first clutch (2), arranged between the combustion engine (1) and the electric machine (3), and a second clutch (5), arranged between the electric machine (3) and the transmission (4), with at least one control unit (6);
adjusting torque transferred by the second clutch (5) to a nominal driving torque;
synchronizing torque of the electric machine (3) with at least one of torque of the combustion engine (1) and a clutch torque of the first clutch (2); and
at least partially combining the torque of the combustion engine (1) with the torque of the electric machine (3) to initiate driving the vehicle.

\* \* \* \* \*